July 18, 1933. E. E. HAGELINE 1,918,537
CONVEYING MECHANISM
Filed Aug. 6, 1931 5 Sheets-Sheet 1

Witnesses:
C. E. Wessels
F. C. Appleton

Inventor.
Emil Edward Hageline;
By Joshua R. H. Potts.
his Attorney.

July 18, 1933.                E. E. HAGELINE                 1,918,537
                           CONVEYING MECHANISM
                            Filed Aug. 6, 1931            5 Sheets-Sheet 2

Witnesses:
E. E. Wessels
F. C. Appleton

Inventor:
Emil Edward Hageline;
By Joshua R H Potts
his Attorney.

July 18, 1933.  E. E. HAGELINE  1,918,537
CONVEYING MECHANISM
Filed Aug. 6, 1931    5 Sheets-Sheet 4

Inventor:
Emil Edward Hageline;
By Joshua R.H. Potts,
his Attorney.

Patented July 18, 1933

1,918,537

UNITED STATES PATENT OFFICE

EMIL EDWARD HAGELINE, OF CHICAGO, ILLINOIS, ASSIGNOR TO HARRY D. LATHROP, OF CHICAGO, ILLINOIS

CONVEYING MECHANISM

Application filed August 6, 1931. Serial No. 555,526.

This invention relates to conveying mechanism and has for its object the provision of improved conveying apparatus employing a plurality of conveyor trackways angularly disposed with relation to each other, together with means for transporting or conveying articles upon the various trackways, and means for arresting the travel of articles upon selected trackways so as to provide for a continuous delivery of articles without interference. A further object is the provision of a main conveyor trackway or guideway with conveyor mechanism associated therewith and one or more auxiliary feeding conveyor mechanisms adapted to convey articles to said main coveyor, together with means for arresting the travel of articles upon said auxiliary conveyor or conveyors, when an article is being conveyed upon said main conveyor at a point which would interfere with the article conveyed upon the auxiliary conveyor or conveyors. The apparatus as disclosed is particularly adapted for milk handling plants, and the particular embodiment shows crates of bottled milk to illustrate the invention. It will be understood, however, that the invention is not limited to this character of article to be conveyed, but may be employed for any purpose where apparatus of this character is suitable.

Other objects will appear thereinafter.

The invention consists in the combinations and arrangements of parts hereinafter described and claimed.

The invention will be best understood by reference to the accompanying drawings forming a part of this specification, and in which—

As illustrated in the drawings, the preferred embodiment of the invention comprises a main linear conveyor 15. Up to the point shown in Fig. 3 the articles are conveyed at a relatively slower speed than from this point on. This is for the purpose of allowing ample space on the high speed delivery portion of the main conveyor to accommodate not only the articles being conveyed on the main conveyor, but also the articles being fed to the main conveyor from the auxiliary conveyors. In other words, to the point shown in Fig. 3 and the corresponding point in Fig. 1, the articles are conveyed at a relatively slow speed in accordance with the required speed to accommodate articles being supplied to the conveyor to be conveyed to this point, but from this point forward to the discharge end of the main conveyor the conveying mechanism is speeded up in order that the discharge portion of the main conveyor may remove and discharge not only articles fed from the preliminary portion of the main conveyor, but also articles supplied or fed from the auxiliary conveyor or conveyors.

Figures 1, 3:
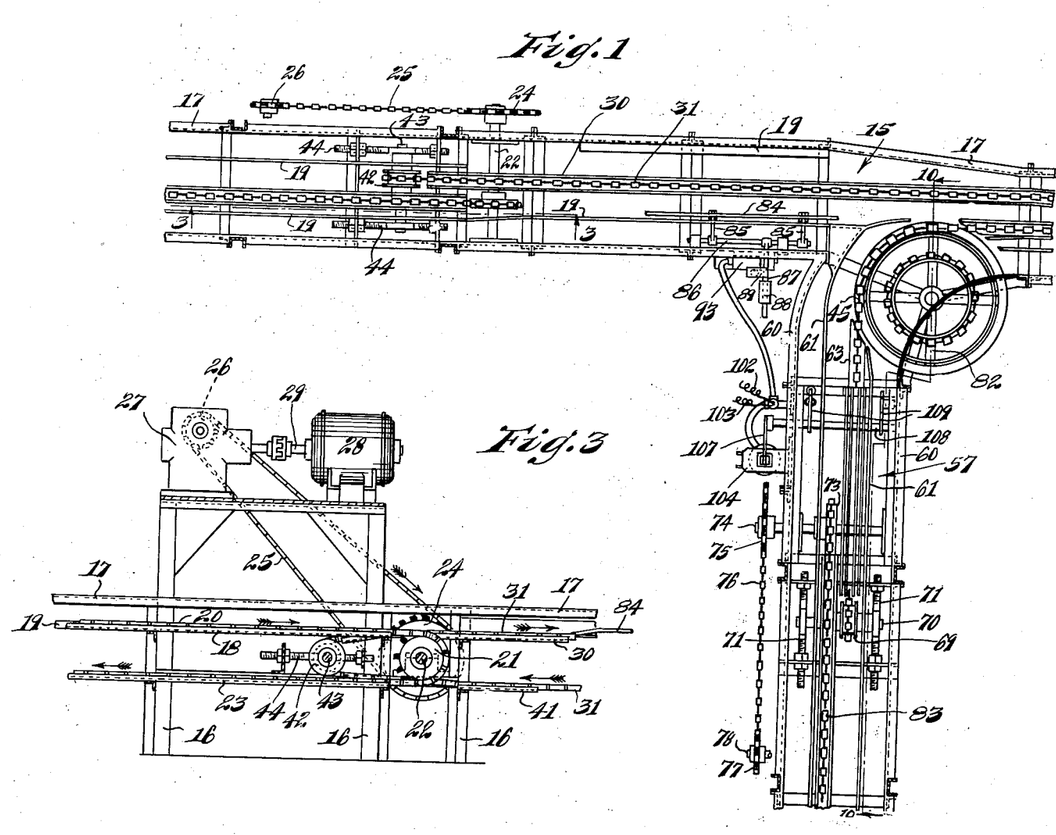
Fig. 1 is a plan view showing the main conveyor and one of the auxiliary or feeding conveyors operatively associated with the main conveyor.
Fig. 3 is a vertical sectional view taken substantially on the line 3—3 of Fig. 1, showing the driving mechanism for the slow speed conveyor chain on the main conveyor.

The main conveyor, therefore, comprises a framework having supporting legs 16 which carry the conveyor frame comprising laterally spaced article guide rails 17, and the conveyor mechanism which consists of an upper channel member 18 disposed at a lower level than the guide rails 17, and trackways 19. The conveyor chains employed in the present invention which actually engage the articles for conveying purposes are all of the same type and are composed of links connected so as to be universally flexible in order that the chains may flex in both vertical and horizontal planes. Upon the low speed feeding portion of the main conveyor, the articles are conveyed by a conveyor chain 20, the upper surface of which extends at a slight elevation above the channel 18 and the trackways 19 in order to contact supportingly with the article. This preliminary low speed feeding conveyor chain is driven by a sprocket 21 secured to transverse shaft 22 journaled in the framework of the machine, as shown in Fig. 3. After passing over sprocket 21, the lower run of chain 20 travels rearwardly in a lower channel chain guide 23.

Figures 2, 4:
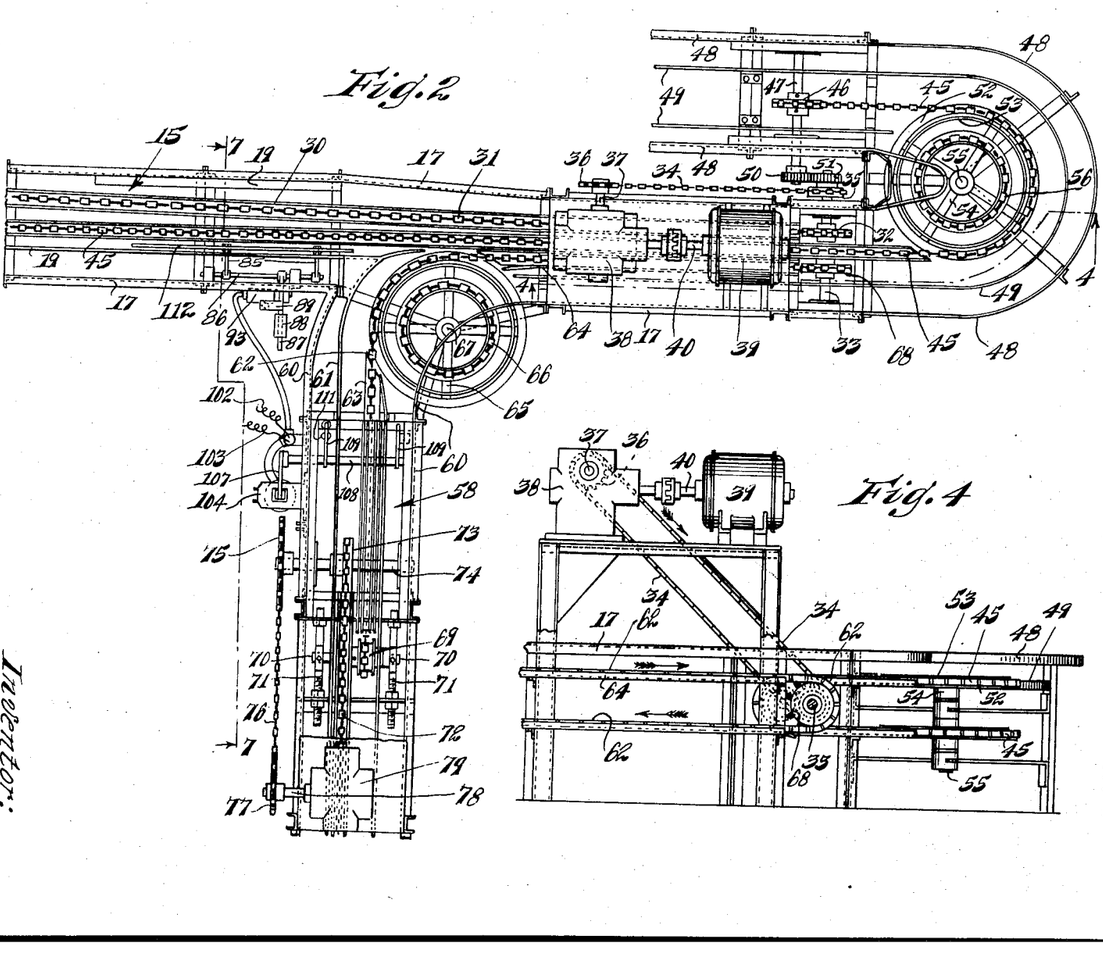
Fig. 2 is a continuation of Fig. 1 showing the main conveyor and a second auxiliary or feeding conveyor, as well as the delivery or discharge end of the apparatus.
Fig. 4 is a vertical sectional view taken substantially on the line 4—4 of Fig. 2, showing the driving mechanism for the high speed conveyor chain on the main conveyor.
Figure 5:
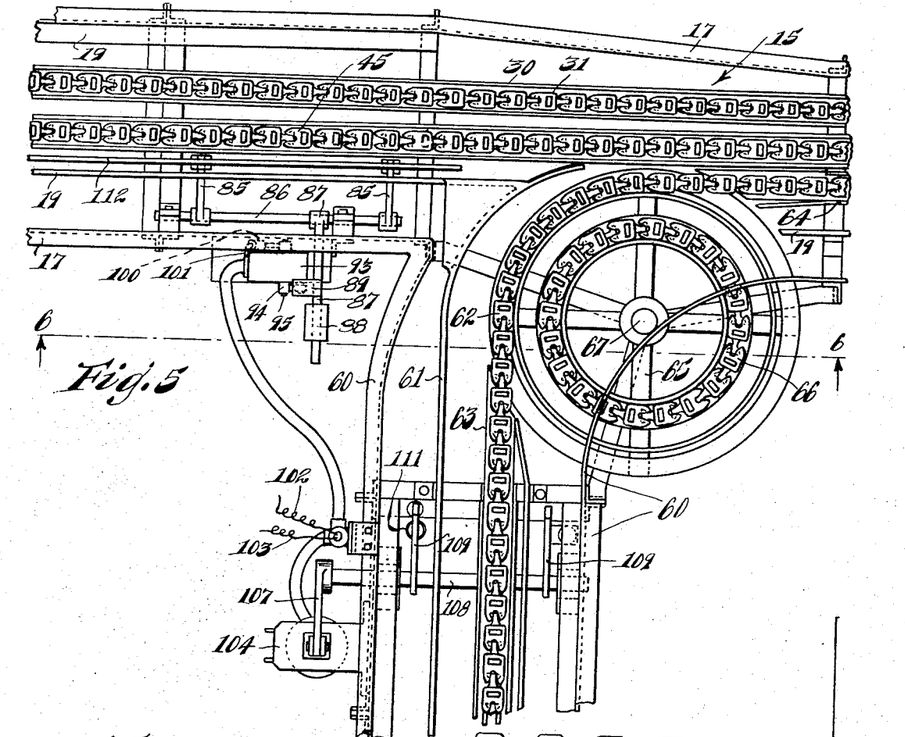
Fig. 5 is an enlarged plan view of the central portion of Fig. 2, to more clearly illustrate the operating mechanism.
Figure 6:
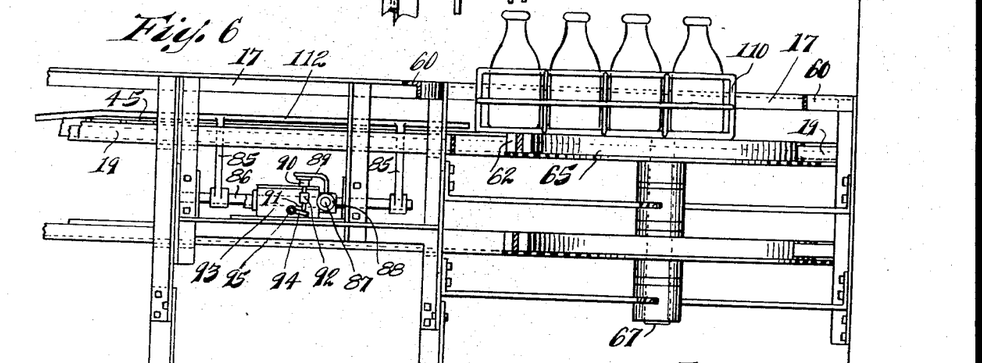
Fig. 6 is a vertical sectional view taken substantially on the line 6—6 of Fig. 5.

Shaft 22 carries a driving sprocket 24 driven by chain 25 connected to sprocket 26 mounted on a shaft extending from reduction gearing assembly 27, which in turn encloses gearing driven by motor 28 through shaft 29. The high speed conveyor chain travels within channel chain guideway 30 which extends in overlapped relationship with the channel 18, as shown in Fig. 1, whereby conveyance of the articles is not interrupted, and channel 30 supports a high speed conveyor chain 31. The upper surface of conveyor chain 31 extends a slight distance above the channel 30 and the correlated trackways 19 corresponding to the arrangement in connection with conveyor chain 20, and this same construction and arrangement is employed in connection with all of the conveyor chains. The high speed conveyor chain 31 is driven by sprocket 32 secured to transverse drive shaft 33 journaled in the frame of the machine, as shown in Fig. 2. Shaft 33 is driven by chain 34 which travels over driven sprocket 35 secured to shaft 33 and drive sprocket 36. Sprocket 36 is secured to shaft 37 extending from gear reduction assembly 38 containing gearing driven by motor 39 by means of shaft 40.

The lower run of high speed conveyor chain 31 travels in lower channel guide 41 and thence to pulley 42 loosely mounted on shaft 43, which in turn is capable of forward or rearward adjustment through threaded adjusting bolts 44.

In the preferred embodiment of the invention illustrated, the articles conveyed at the discharge end of the machine make a complete reverse travel, although it will be understood that a linear discharge or a discharge at any desired angle may be provided for. This discharge operation is carried out by means of the high speed conveyor chain 45 forming a continuation of the first auxiliary feeding or conveying mechanism, as presently explained. Chain 45 is driven by sprocket 46 secured to shaft 47 journaled in the discharge framework 48, having discharge trackways 49, as shown in Fig. 2. Shaft 47 has secured thereto gear 50 which meshes with gear 51 secured to shaft 33, and by this construction and arrangement the chain 45 is driven at the same linear speed as chain 31. In making the complete reverse delivery turn shown in Fig. 2, chain 45 travels upon supporting ledge 52 formed by annular flange 53 of a horizontally rotating wheel 54 loosely mounted on stud shaft 55. Also to facilitate travel of the conveyed article, an inner endless chain 56 is similarly carried by wheel 54. The foregoing apparatus handles the articles on the main conveyor portion of the apparatus, from the extreme left portion as shown in Fig. 1 having the low speed conveyor mechanism, to the extreme right portion shown in Fig. 2, completing the high speed conveyor mechanism.

In carrying out the invention, any number of auxiliary lateral feeding conveyors may be employed to feed and convey articles to the main conveyor, but regardless of the number, provision is made for discharging articles from the auxiliary conveyors without interference with the articles being conveyed upon the main conveyor. In the embodiment shown, Fig. 1 illustrates a first auxiliary conveyor 57, and Fig. 2 illustrates a second auxiliary conveyor 58. Lateral conveyor 58, for example, comprises suitable framework having supporting legs 59, lateral article guide rails 60, and trackways 61. Articles are conveyed from the auxiliary conveyor 58 to the main conveyor 15 by means of high speed conveyor chain 62 which travels in channel 63 upon the auxiliary conveyor, and in a corresponding channel 64 upon the main conveyor. Inasmuch as auxiliary conveyor 58 is angularly disposed with relation to the main conveyor 15, chain 62 travels upon wheel 65 which is identical in construction and operation with wheel 54 heretofore explained. Wheel 65 carries an inner endless article supporting chain 66 and is loosely mounted upon vertical stud shaft 67. Chain 62 is driven by sprocket 68 mounted upon shaft 33 in the main conveyor and travels over pulley 69 loosely mounted upon transverse shaft 70 in the auxiliary conveyor and longitudinally adjustable by means of adjusting bolts 71. The lower return run of all of the chains travels in a channel chain guide identical in construction with the upper channel chain supporting guide.

The auxiliary conveyor 58 is provided with a low speed feeding conveyor chain 72 which travels in a suitable channel and is driven by sprocket 73 mounted upon shaft 74 journaled in the frame of the auxiliary conveyor. Shaft 74 is provided with a driven sprocket 75 which carries chain 76 traveling over drive sprocket 77 which is mounted upon shaft 78 extending from gear reduction assembly 79. Gearing in assembly 79 is driven by a motor 80 by means of shaft 81 (see Figs. 7 and 10). Where an upper chain carrying conveyor wheel is provided for supporting the upper run of a conveyor chain, it will be understood that a corresponding lower chain supporting wheel is provided to carry the lower run of the chain. Similarly, the construction and mode of operation of the auxiliary conveyors 57 and 58 and the associated mechanism are identical. It will therefore be understood that when a part is described in detail with respect to either of these auxiliary conveyors, the same description applies to the other. For this reason, a detailed description of auxiliary conveyor 57 will not be given except where the construction and association with the main conveyor differ from the auxiliary conveyor 58.

Referring again to delivery conveyor chain 45 at the discharge end of the machine, this chain travels upon wheel 82 associated with the first auxiliary conveyor 57. Articles are conveyed to high speed conveyor chain 45 in the first auxiliary conveyor 57 from the low speed conveyor chain 83 corresponding to low speed conveyor chain 72 of the second auxiliary conveyor 58.

Figures 7, 8, 9:
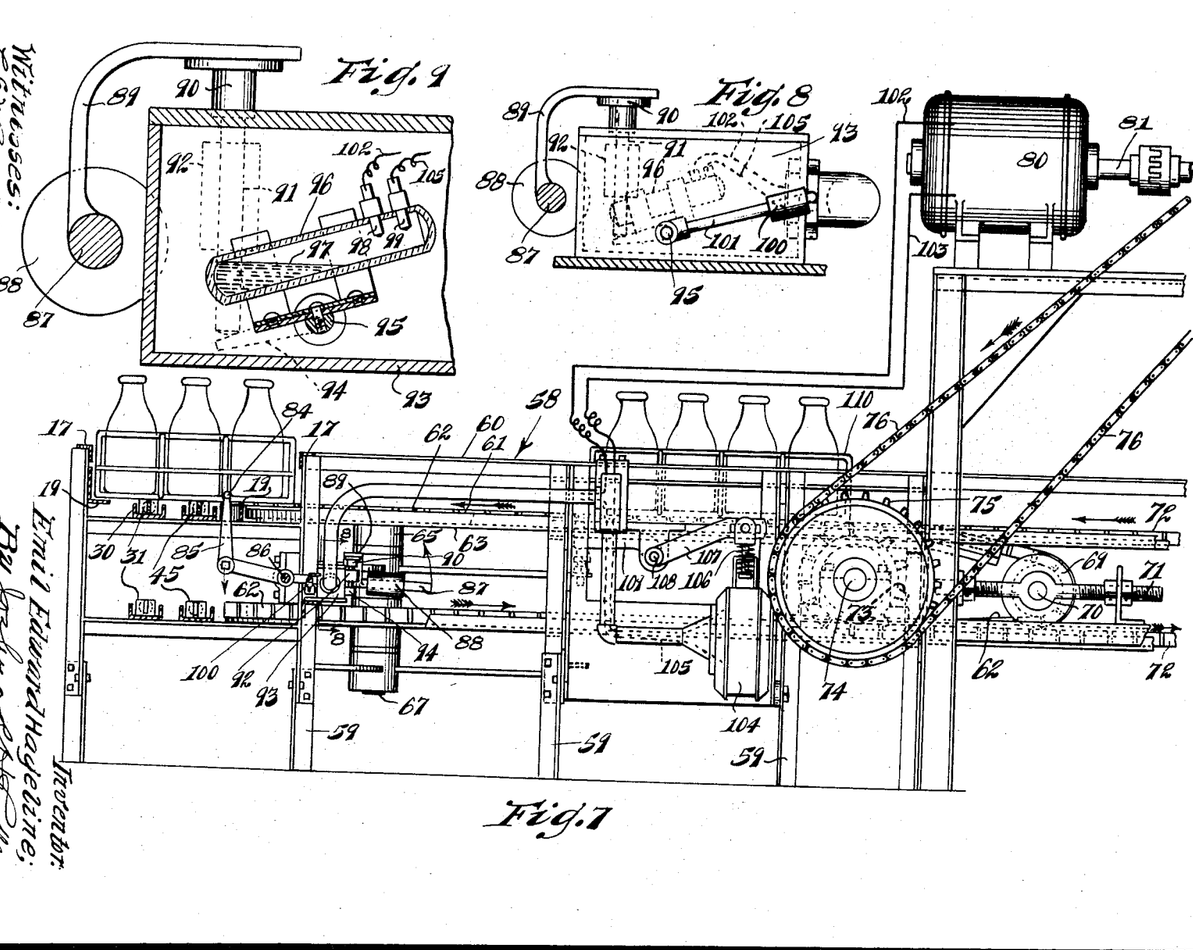
Fig. 7 is an enlarged vertical sectional view taken substantially on the line 7—7 of Fig. 2.
Fig. 8 is a view of the switch box enclosing the mercury switch which makes and breaks the circuit for the arresting means on the auxiliary conveyor.
Fig. 9 is an enlarged vertical sectional view of the switch mechanism shown in Fig. 8.
Figures 10, 11, 12:
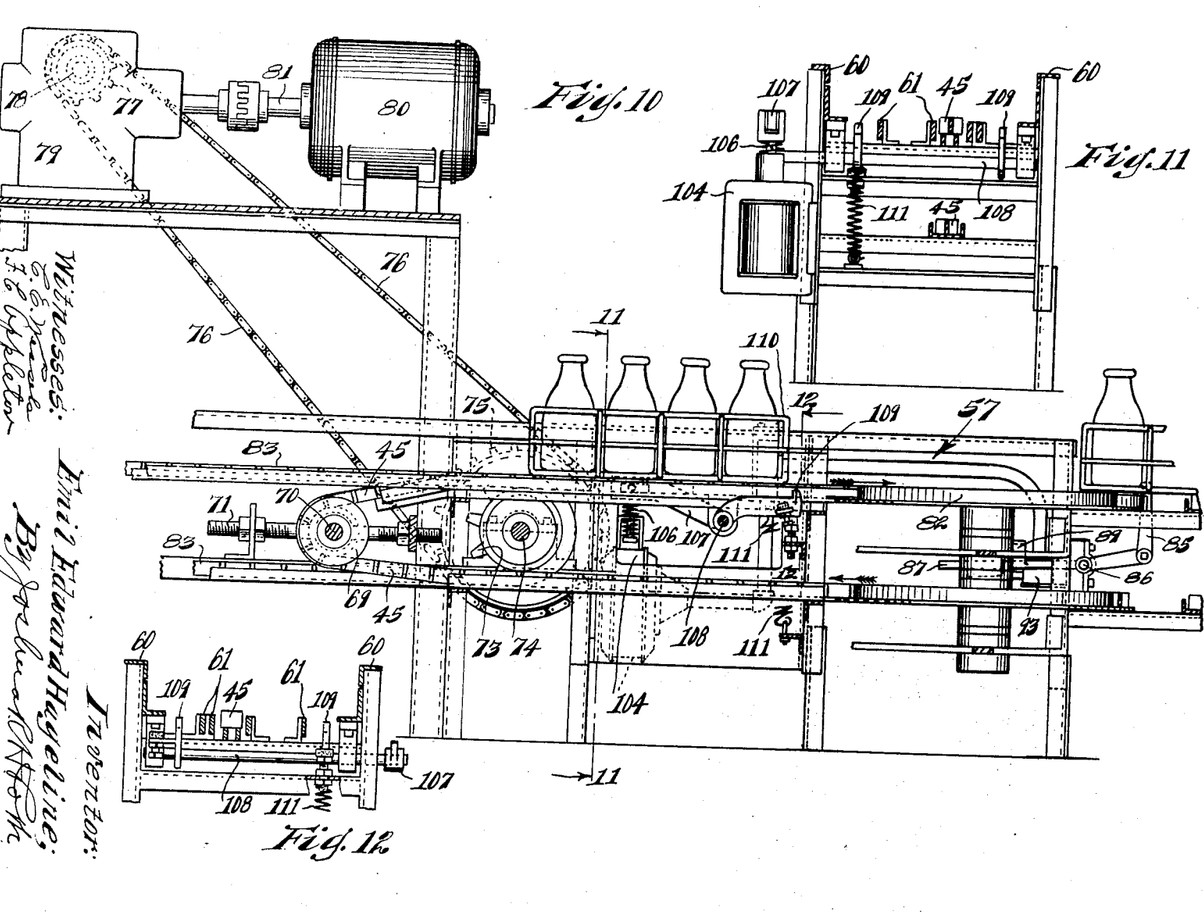
Fig. 10 is an enlarged vertical sectional view taken substantially on the line 10—10 of Fig. 1.
Fig. 11 is a vertical sectional view taken substantially on the line 11—11 of Fig. 10.
Fig. 12 is a vertical sectional view taken substantially on the line 12—12 of Fig. 10.

Special mechanism is provided for arresting the travel of an article or object in the auxiliary conveyors when an article is being conveyed upon the main conveyor in such manner that they might interfere or collide, and this means also serves to regulate the travel of articles upon the main conveyor received or carried by all of the conveyors to the discharge end. Referring to Figs. 1, 7 and 10, a depressible shoe member 84 normally elevated so as to stand in the path of an article being conveyed, is mounted upon arms 85 secured to rock shaft 86 suitably journaled in the frame of the machine. Shaft 86 has mounted thereon an oppositely extending arm 87 upon which is slidably mounted weight 88 tending normally to maintain shoe member 84 in elevated position. Mounted upon arm 87 is a L-shaped arm 89, as best shown in Figs. 1, 8 and 9, the under surface of the horizontal upper portion of which contacts with head 90 of a vertically reciprocating plunger 91 slidably mounted in a bearing 92 provided in the switch box 93. The lower extremity of plunger 91 is adapted to contact with a projection 94 secured to rock shaft 95, and rock shaft 95 has mounted thereon a tiltable mercury switch 96 containing mercury 97 and provided near one end with electrical contacts 98 and 99, whereby when plunger 91 is in lowered position as shown in Fig. 9 the mercury is out of contact with the contacts 98 and 99 and the circuit is open, whereas when plunger 91 is in elevated position the mercury is in contact with said contacts 98 and 99 and the circuit is closed, switch 96 normally being held tilted in circuit breaking position until said shoe member 84 is depressed, whereupon it is rocked to circuit closing position by weight 100 mounted on arm 101 secured to shaft 95 as best shown in Fig. 8. By the construction and arrangement shown, when shoe 84 is depressed by contact with an article therewith, the electric circuit hereinafter described through contacts 98 and 99 is closed, but when shoe 84 is in normal elevated position, the circuit is open as shown in Fig. 9. Weight 100 upon the arm 101 is merely sufficient to maintain the head 90 of plunger 91 in contact with the upper portion of arm 89, whereas the considerably heavier weight 88 serves to normally maintain shoe 84 in elevated position and plunger 91 depressed to hold switch 96 in open condition.

Electric energy for actuating the arresting means is provided through wires 102 and 103 preferably leading from the same source of electrical energy (not shown) which supplies the motor 80, as shown in Fig. 7, but having no effect on the motor control or operation. Wire 102 is connected to contact 98, and wire 103 is connected to one terminal of a solenoid coil, not shown in detail but obviously constructed and contained within solenoid housing 104. The other terminal of the solenoid is connected to wire 105, which in turn is connected to contact 99 of switch 96. These various wires may be suitably enclosed in conduit piping as shown, and the solenoid core is normally maintained in elevated position by means of coil spring 106. The upper extremity of the solenoid core is pivotally connected to one extremity of a detent lever 107, the intermediate portion of which is pivotally mounted at 108, and the opposite portion of which carries a pair of detaining dogs 109 adapted to be elevated into the path of an article such as a milk bottle crate 110, when the latter is in position, as shown in Figs. 7 and 10, and the shoe member 84 is depressed and consequently the circuit closed. The detaining dogs 109 are normally swung to lowered position out of the path of the crate or other article 110 by means of a tension spring 111. After an article has passed beyond shoe 84 on the main linear conveyor 15 as shown in Figs. 7 and 10, switch 96 is swung to circuit opening position as shown in Fig. 9, thereby releasing the crate or article that has been detained as described, and permitting the article to follow that article which has just passed beyond the shoe 84 on the main conveyor.

Referring to Fig. 2, the feeding of articles from auxiliary conveyor 58 is similarly controlled by means of shoe member 112 which corresponds with shoe member 84 associated with conveyor 57. It will be understood, however, that shoe member 112 is of sufficient length to provide for its elevation between two successive articles being conveyed upon the main conveyor and spaced apart sufficiently to allow for the feeding of an article from auxiliary conveyor 58 onto the main conveyor between such two articles. In other words, if there is not sufficient room or sufficient time for an article being arrested on conveyor 58 to be interposed between two successive articles on the main conveyor 15, shoe member 112 will remain depressed until such time occurs. Otherwise the construction and operation of the detaining means and the feeding control of articles on auxiliary conveyor 58 are identical with those in connection with auxiliary conveyor 57.

In the foregoing explanation of the construction of the apparatus, explanation of operation has been included to facilitate understanding. Articles are normally initially conveyed upon the main conveyor by means of a relatively slow speed conveyor chain. At a point preceding the first auxiliary conveyor the article is delivered to a relatively high speed conveyor chain upon the main conveyor, and simultaneously with the conveyance of articles upon the main conveyor, articles are conveyed upon as many of the auxiliary conveyors as it may be desired to provide. The high speed delivery portion of the main conveyor serves to convey the articles in lineally spaced relation and at sufficient speed to accommodate the reception of articles that are fed from the lateral auxiliary conveyors at substantially the same speed. As an article upon the main conveyor approaches any one of the auxiliary conveyors, arresting means associated with such auxiliary conveyor are actuated so as to arrest the travel of an article upon the auxiliary conveyor. In other words, when an article traveling upon the main conveyor reaches a point approximately in alignment with an auxiliary conveyor or in proximity to the communicable junction of the auxiliary conveyor and the main conveyor, mechanism is actuated through the medium of that particular article being conveyed upon the main conveyor to arrest the travel of an article upon the auxiliary conveyor. When the article upon the main conveyor has passed the means which actuates the arresting mechanism, the article arrested upon the auxiliary conveyor is released so as to follow in line behind the article conveyed upon the main conveyor, and thus maintain control over the delivery of articles to the main conveyor from the auxiliary conveyors with relation to the travel of articles upon the main conveyor.

It may be here also noted that the cooperative relatively fast and slow speed conveyors are of importance in the efficient operation of controlling the entrance of the crates or other articles to the main linear conveyor from the lateral auxiliary conveyors. The function of these is obviously advantageous in assuring the proper spacing of the articles on the main conveyor after they leave the preliminary slow speed feeding conveyor of which said high speed linear conveyor is a continuation. It is this spacing of the crates or other articles as they start upon the higher speed conveyor, whether the crates are moving in close contact or abutting relation or not while traveling on the slow speed preliminary feeding conveyor, together with the comparative lengths of the respective depressible shoes on the main conveyor, which controls the operation of the mechanism in checking the movement of the crates or articles from the lateral auxiliary conveyors, and by which provision the crates or articles may be loaded on the preliminary conveyor either manually or by mechanical means and with no particular regularity or uniformity in spacing the crates or articles on said slow speed feeding conveyor.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. Conveying apparatus of the character described, comprising, in combination, a main article conveyor having a channel chain guideway and a flexible conveyor chain arranged to travel in said guideway and to project above the upper surface thereof for supporting contact with articles being conveyed thereon, an auxiliary article conveyor for discharging articles laterally onto said main article conveyor and having a channel chain guideway extending in proximity to said main conveyor at the communicable junction of said auxiliary conveyor therewith, a supplemental channel chain guideway disposed in said main article conveyor in parallel cooperative relation to the first mentioned channel chain guideway thereof and functioning as a continuation of said channel chain guideway of the auxiliary article conveyor, an auxiliary flexible conveyor chain arranged to travel on said channel chain guideway in the auxiliary article conveyor and on said supplemental chain channel guideway in said main article conveyor, said auxiliary chain projecting above the upper surfaces of said guideways for supporting contact with articles conveyed thereon, power means for driving said main and auxiliary conveyor chains simultaneously and at the same speed, and means for movably supporting said auxiliary conveyor chain between the channel chain guideway of the auxiliary article conveyor and the supplemental channel chain guideway of the main article conveyor.

2. Conveying apparatus of the character described, comprising, in combination, a main article conveyor having a channel chain guideway and a flexible conveyor chain arranged to travel in said guideway and to project above the upper surface thereof for supporting contact with articles being conveyed thereon, an auxiliary article conveyor for discharging articles laterally onto said main article conveyor and having a channel chain guideway extending in proximity to said main conveyor at the communicable junction of said auxiliary conveyor therewith, a supplemental channel chain guideway disposed in said main article conveyor in parallel co-operative relation to the first mentioned channel chain guideway thereof and functioning as a continuation of said channel chain guideway of the auxiliary article conveyor, an auxiliary flexible conveyor chain arranged to travel on said channel guideway in the auxiliary article conveyor and on said supplemental channel chain guideway in said main article conveyor, said auxiliary chain projecting above the upper surfaces of said guideways for supporting contact with articles conveyed thereon, common power means operating to drive said main and auxiliary conveyor chains simultaneously and at the same speed, and an idler wheel mounted to rotate about a vertical axis and disposed adjacent the junction of said auxiliary article conveyor and said main article conveyor, said idler having provision peripherally for supporting said auxiliary conveyor chain and also having a supplemental concentric article supporting and conveying portion intermediate its periphery and axis.

3. Conveying apparatus of the character described, comprising, in combination, a main article conveyor having a channel chain guideway and a flexible conveyor chain arranged to travel in said guideway and to project above the upper surface thereof for supporting contact with articles being conveyed thereon, an auxiliary article conveyor for discharging articles onto said main article conveyor and having a channel chain guideway extending in proximity to said main conveyor at the communicable junction of said auxiliary conveyor therewith, a supplemental channel chain guideway disposed in said main article conveyor in parallel co-operative relation to the first mentioned channel chain guideway thereof and functioning as a continuation of said channel chain guideway of the auxiliary article conveyor, an auxiliary flexible conveyor chain arranged to travel on said channel chain guideway in the auxiliary article conveyor and on said supplemental channel chain guideway in said main article conveyor, said auxiliary chain projecting above the upper surfaces of said guideways for supporting contact with articles conveyed thereon, common power means for driving said main and auxiliary conveyor chains, rotatable means for supporting said auxiliary conveyor chain between the channel chain guideway in the auxiliary article conveyor and the supplemental channel chain guideway in the main article conveyor and cooperatively adjacent said main conveyor, detaining means movable into the path of an article upon said auxiliary conveyor for arresting the travel of the article without interference with the auxiliary conveyor chain, and means operable by an article being conveyed upon said main conveyor for actuating said detaining means when the article upon said main conveyor is positioned in proximity to the communicable junction of said main conveyor with said auxiliary conveyor.

4. Conveying apparatus of the character described, comprising, in combination, a main article conveyor, feeding means cooperating with said main article conveyor whereby articles to be conveyed are delivered automatically onto said conveyor and carried thereon in normal lineally spaced relation for the interposition of additional articles in the spaces between the articles so delivered, an auxiliary article conveyor cooperatively arranged to deliver articles laterally onto said main conveyor and into the line of spaced initially delivered articles, and means operably controlled by the movement of articles on said main conveyor for arresting the travel of the article next adjacent said main conveyor on said auxiliary conveyor, said arresting means being effective when the controlling article on said main conveyor is positioned in proximity to the communicable junction of said auxiliary conveyor with said main conveyor, and is followed by an article with space therebetween insufficient for the interposition of an article from said auxiliary conveyor.

5. Conveying apparatus of the character described, comprising, in combination, a main article conveyor, an auxiliary article conveyor for discharging articles laterally onto said main conveyor, said main and auxiliary article conveyors having article moving means including traveling chains normally projected above guideways for supporting contact with articles being conveyed thereon, said auxiliary conveyor chain extending into the main conveyor in parallel cooperative relation to the chain of the latter, common power means for driving said chains, an idler wheel mounted to rotate about a vertical axis and disposed adjacent the junction of said auxiliary conveyor and said main conveyor for supporting said auxiliary conveyor chain in cooperative relation to the chain of said main conveyor, detaining means for arresting travel of an article upon said auxiliary conveyor adjacent its junction with said main conveyor without interference with the auxiliary conveyor chain, and means operable by an article being conveyed upon said main conveyor for actuating said detaining means when the article upon said main conveyor is positioned in proximity to the communicable junction of said main conveyor with said auxiliary conveyor, said article operable means arranged to be engaged by two successive articles traveling on said main conveyor with insufficient space between said successive articles for the interposition of an article from said auxiliary conveyor.

6. Conveying apparatus of the character described, comprising, in combination, a main article conveyor having a channel chain guideway, parallel cooperating article guideways and a flexible conveyor chain arranged to travel in said chain guideway and to project above the upper surface thereof for supporting contact with articles being conveyed, an auxiliary article conveyor for discharging articles laterally onto said main conveyor and having a channel chain guideway, parallel cooperating article guideways and a flexible conveyor chain arranged to travel in said last named chain guideway and to project above the upper surface thereof for supporting contact with articles being conveyed, said auxiliary conveyor chain extending into said main conveyor in parallel cooperative relation to the chain of said main conveyor and having an additional chain guideway in said main conveyor for accommodating said auxiliary conveyor chain, supplemental means for supporting said auxiliary conveyor chain between said auxiliary conveyor and said main conveyor at the communicable junction thereof, detaining means for arresting travel of an article upon said auxiliary conveyor adjacent said junction without interference with the auxiliary conveyor chain, means operable by an article being conveyed upon said main conveyor for actuating said detaining means when the article upon said main conveyor is positioned in proximity to the communicable junction of said main conveyor with said auxiliary conveyor, power means for driving said main and auxiliary conveyor chains simultaneously and at substantially the same speed a preliminary feeding conveyor in alignment with said main conveyor and provided with a flexible conveyor chain, and power means for driving said preliminary feeding conveyor chain at less speed than said main conveyor chain.

EMIL EDWARD HAGELINE.